United States Patent [19]

Gorsuch

[11] Patent Number: 4,544,991
[45] Date of Patent: Oct. 1, 1985

[54] LIGHTED RUNNING BOARD
[75] Inventor: Ralph E. Gorsuch, Elkhart, Ind.
[73] Assignee: Elkhart Machine & Tool Co., Inc., Elkhart, Ind.
[21] Appl. No.: 685,388
[22] Filed: Dec. 24, 1984
[51] Int. Cl.[4] ............................................. B60Q 1/32
[52] U.S. Cl. ..................................... 362/81; 362/249; 280/164 R
[58] Field of Search ...................... 362/81, 73, 76, 146, 362/249, 252, 367; 280/164 R, 164 A, 169; 52/182, 191, 188

[56] References Cited

U.S. PATENT DOCUMENTS

| | | | |
|---|---|---|---|
| 1,439,210 | 12/1922 | Webster et al. | 362/81 |
| 1,460,316 | 6/1923 | Dobschutz | 362/81 |
| 1,515,717 | 11/1924 | Ayotte | 362/81 |
| 1,519,734 | 12/1924 | Komacki | 362/81 |
| 3,885,144 | 5/1975 | Lewis et al. | 362/146 |
| 4,463,962 | 8/1984 | Snyder | 362/81 |

*Primary Examiner*—Magdalen Y. C. Moy
*Attorney, Agent, or Firm*—James D. Hall

[57] ABSTRACT

A lighted running board for vehicles including a deck, a kick plate and a rib. The kick flange and rib include openings in which lights are positioned, the lights including clips for securement within the openings. A rear cover member attached to the inner face of the kick plate and rib houses and protects the electrical connections between the lights and the power source.

2 Claims, 5 Drawing Figures

U.S. Patent  Oct. 1, 1985  Sheet 1 of 2  4,544,991
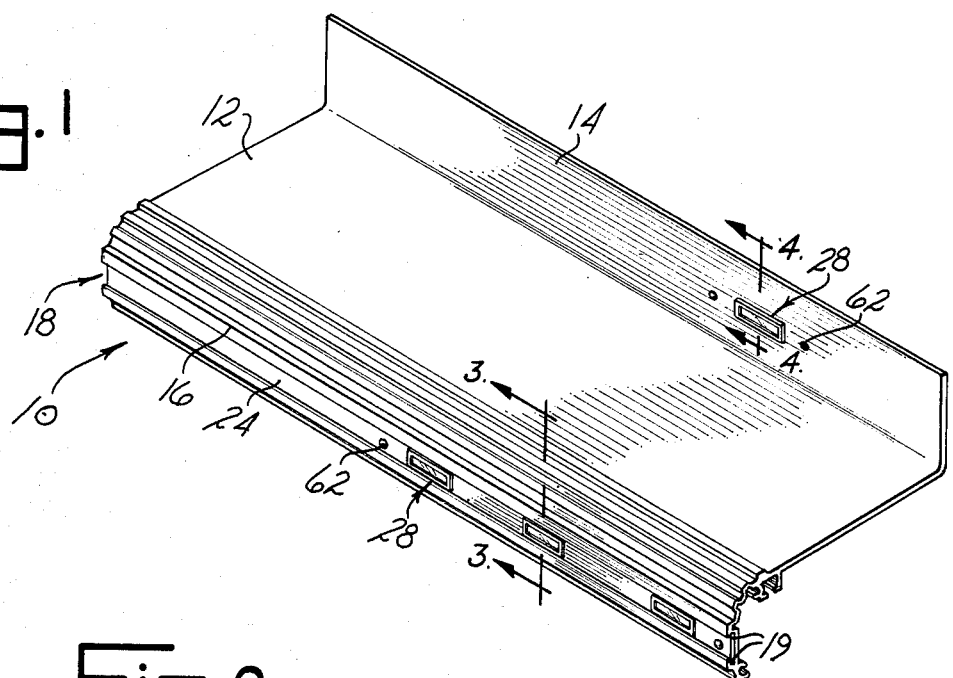
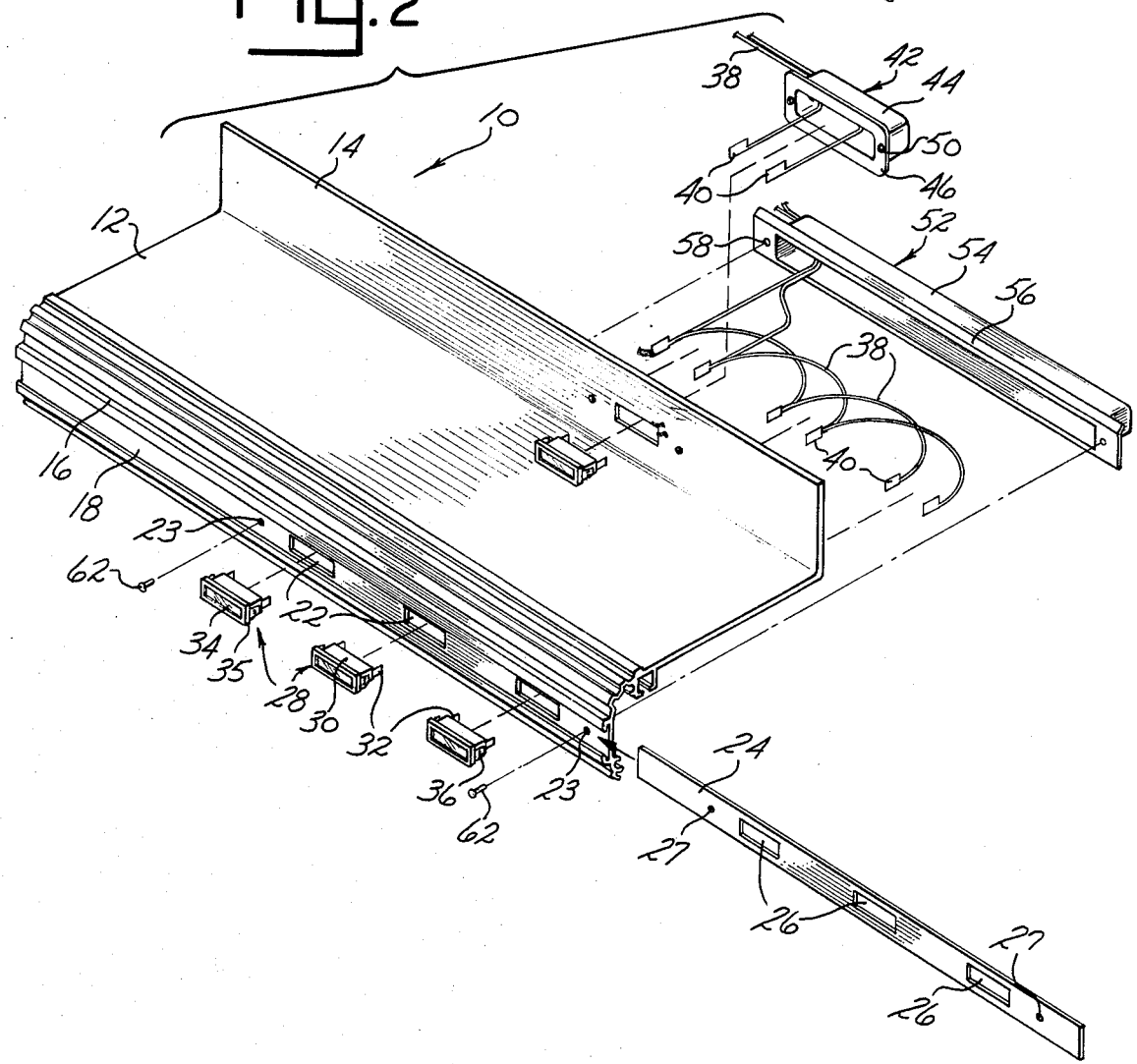

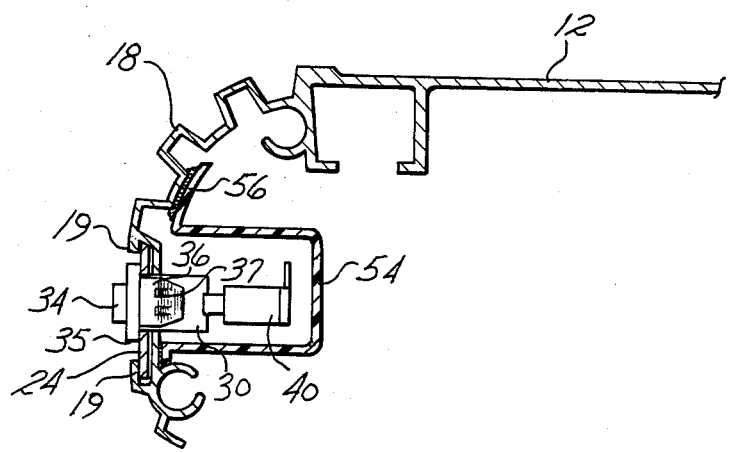
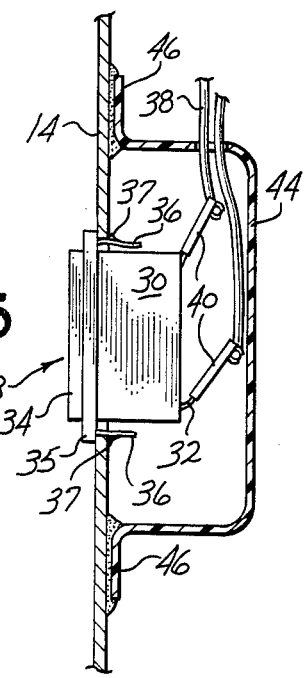
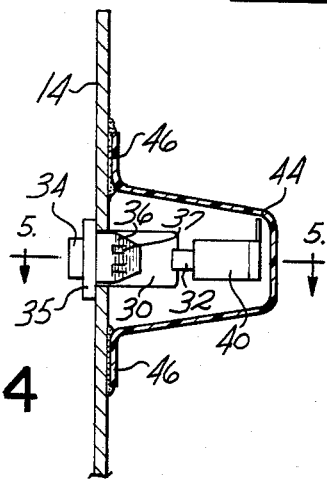

LIGHTED RUNNING BOARD

SUMMARY OF THE INVENTION

This invention relates to an improved lighted running board for vans and other similar vehicles.

The running board of this invention includes a deck and a kick plate. A rib depends downwardly from the deck. Openings are formed in the kick plate and rib which are provided with lights. Each light includes clips which allow the light to snap-fit into the opening. Each light is enclosed at its rear by a cover. The cover is a box-shaped member having a peripheral flange, which allows for its sealed securement to the kick panel or rib of the running board, protecting the light from dirt and moisture. The light is removable from the front of the running board.

Accordingly, it is an object of this invention to provide for a novel lighted vehicle running board.

Another object of this invention is to provide for a lighted vehicle running board which allows rapid replacement of the light fixtures.

Another object of this invention is to provide for a lighted vehicle running board which adequately protects the light fixture from the elements.

Other objects of this invention will become apparent upon reading the following description.

BRIEF DESCRIPTION OF THE DRAWINGS

A preferred embodiment of the invention has been depicted for purposes of illustration wherein:

FIG. 1 is a perspective view of the lighted running board of this invention.

FIG. 2 is an exploded view of the running board and its components.

FIG. 3 is a cross sectional view taken along line 3—3 of FIG. 1, with the light fixture shown in solid line form for ease of illustration.

FIG. 4 is a cross sectional view taken along line 4—4 of FIG. 1, with the light shown in solid line form for ease of illustration.

FIG. 5 is a sectional view taken along line 5—5 of FIG. 4, with the light shown in solid line form for ease of illustration.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize the invention.

The running board 10 shown in the drawings is adapted for use with a van or other similar vehicle. Board 10 includes a deck 12, a kick flange or plate 14 extending upwardly from the rear of the deck, and a rib 16 extending downwardly from the front of the deck. Rib 16 includes a channel 18 which extends between ends of the running board.

An opening 20 is formed in kick flange 14. A plurality of longitudinally spaced openings 22 are formed in rib channel 18. Bores 23 are formed in rib channel 18 adjacent the outermost side edges of the terminal openings 22. A decorative cover strip 24 is slidably located in rib channel 18 between inturned opposing lips 19 and includes openings 26 which are aligned with rib openings 22 and bores 27 which are aligned with rib bores 23.

Board 10 includes light fixtures 28 which have a base 30. Tabs 32 formed of electrically conductive material extend from fixture base 30 and are connected to an internal bulb (not shown). A plastic light shield 34 encloses the open end of fixture base 30 and protects the enclosed bulb (not shown). Shield 34 includes a peripheral flange 35. Affixed to each end of fixture base 30 is a flexible clip 36 which includes a projecting rib 37.

Board 10 also includes a kick plate rear cover member 42 and a rib rear cover member 53. Cover member 42 has a body 44 of open box configuration as seen in FIG. 2. A peripheral flange 46 extends from cover body 44. Bores 50 extend through cover flange 46. Rib rear cover member 52 includes a body 54 of open box configuration and a peripheral flange 56 having bores 58.

Board 10 is assembled as follows. Cover strip 24 is slid into rib channel 18 until all openings and bores are aligned. A series of wires 38 adapted for connection to a power source (not shown) and having couplers 40 are fed through a bore in rib cover member body 54. Couplers 40 are spaced through aligned openings 22 and 26 of rib 16 and strip 24 and then fastened to light fixture tabs 32. A light fixture 28 is then pushed into each aligned rib opening 22 and strip opening 26, flexing clips 36 towards fixture body 30. When clip ribs 37 clear the inner edge of cover strip opening 26, the clips 36 spring or snap outwardly of the fixture body 30 to position the clip ribs behind the cover strip, thereby securing light fixture 28 within openings 22,26. Rib rear cover member 52 is secured and sealed to the rear surface of rib 18 by a silicone or other suitable adhesive 57. Pop rivets 62 are then driven through aligned rib and strip bores 27 and 58 to permanently secure cover member 52 to the rib. This process is then repeated for installation of a light fixture 28 in opening 20 of kick plate 14 as seen in FIG. 5. No cover strip 24 is perferably used over kick plate 14.

Flange 35 of each light fixture 28 forms a seal with the contacting surface of strip 24 or plate 14, as the case may be. Light fixtures 28 can be replaced when necessary by laterally sliding the fixture or clips to free its clips 36 from interlocking contact with rib 16 or plate 14.

It is understood that the scope of the invention is not limited to the above given details, but may be modified within the scope of the appended claims.

I claim:

1. A running board for a vehicle, said board including a horizontal deck, a kick plate having inner and outer faces extending upwardly from a rear edge of said deck, a rib having inner and outer faces extending downwardly from a front edge of said deck, one of said kick plate and rib including an opening formed therein, and a light fixture positioned within said opening, wire means for connecting said light fixture to a power source, the improvement wherein said light fixture includes a peripheral clip member, said clip member constituting means for snap fit interlock of said light fixture to said one kick plate or rib within said opening, said light fixture at least partially overlying the outer face of said one kick plate or rib with said clip member being so interlocked with the one kick plate or rib, a cover member overlying said opening and light fixture at the rear face of said one kick plate or rib, said cover member attached to said rear face and housing said wire means.

2. The running board of claim 1 wherein said cover member includes a body, a peripheral flange extending from said body, and means for securing said flange to one of said kick plate or rib inner faces.

* * * * *